United States Patent
Malzbender

(10) Patent No.: US 10,146,318 B2
(45) Date of Patent: Dec. 4, 2018

(54) TECHNIQUES FOR USING GESTURE RECOGNITION TO EFFECTUATE CHARACTER SELECTION

(71) Applicant: Thomas Malzbender, Palo Alto, CA (US)

(72) Inventor: Thomas Malzbender, Palo Alto, CA (US)

(\*) Notice: Subject to any disclaimer, the term of this patent is extended or adjusted under 35 U.S.C. 154(b) by 456 days.

(21) Appl. No.: 14/717,998

(22) Filed: May 20, 2015

(65) Prior Publication Data

US 2015/0363001 A1    Dec. 17, 2015

Related U.S. Application Data

(60) Provisional application No. 62/012,247, filed on Jun. 13, 2014.

(51) Int. Cl.
*G06K 9/00* (2006.01)
*G06F 3/01* (2006.01)
(Continued)

(52) U.S. Cl.
CPC .............. *G06F 3/017* (2013.01); *G06F 3/005* (2013.01); *G06F 3/04886* (2013.01);
(Continued)

(58) Field of Classification Search
None
See application file for complete search history.

(56) References Cited

U.S. PATENT DOCUMENTS 5,047,952 A    9/1991   Kramer
5,659,764 A    8/1997   Sakiyama
(Continued)

FOREIGN PATENT DOCUMENTS

CN    103383806 A    11/2013
EP     1148411 A2    10/2001
(Continued)

OTHER PUBLICATIONS

Cobos et al., Simplified Human Hand Models based on Grasping Analysis, 2010,IEEE/RSJ International Conference on Intelligent Robots and Systems, pp. 610-615.*
(Continued)

*Primary Examiner* — Vu Le
*Assistant Examiner* — Guillermo M Rivera-Martinez
(74) *Attorney, Agent, or Firm* — Marc P. Schuyler

(57) ABSTRACT

This disclosure provides a pose- or gesture-based recognition system that processes images of the human hand, downconverts degrees of freedom of the human hand to lower-dimensional space, and then maps the downconverted space to a character set. In one embodiment, the system is implemented in a smart phone or as a computer-input device that uses a virtual keyboard. As the user moves his or her hand, the smart phone or computer provides simulated vocal feedback, permitting the user to adjust hand position or motion to arrive at any desired character; this is particularly useful for embodiments which use a phonetic character set. Software that performs character selection can be implemented in a manner that is language/region agnostic, with a contextual dictionary being used to interpret a phonetic character set according to a specific language or region.

17 Claims, 6 Drawing Sheets

(51) Int. Cl.
*G06F 3/0488* (2013.01)
*G06F 3/00* (2006.01)
*G06F 17/27* (2006.01)
*G06N 3/02* (2006.01)

(52) U.S. Cl.
CPC ....... *G06F 17/276* (2013.01); *G06K 9/00355* (2013.01); *G06K 2209/01* (2013.01); *G06N 3/02* (2013.01)

(56) References Cited

U.S. PATENT DOCUMENTS

| | | |
|---|---|---|
| 5,734,923 A | 3/1998 | Sagawa |
| 5,953,693 A | 9/1999 | Sakiyama |
| 6,215,890 B1 | 4/2001 | Matsuo |
| 7,460,690 B2 | 12/2008 | Cohen |
| 7,565,295 B1 | 7/2009 | Hernandez-Rebollar |
| 7,598,942 B2 | 10/2009 | Underkoffler |
| 8,370,383 B2 | 2/2013 | Kramer |
| 8,503,731 B2 | 2/2013 | Lee |
| 8,428,311 B2 | 4/2013 | Dariush |
| 8,493,174 B2 | 7/2013 | Agrawal |
| 9,165,199 B2 | 10/2015 | Zhu |
| 9,230,160 B1 | 1/2016 | Kanter |
| 9,282,377 B2 | 3/2016 | Bruner |
| 9,754,161 B2 | 9/2017 | Levy |
| 2002/0135618 A1* | 9/2002 | Maes .............. G06F 3/0481 715/767 |
| 2005/0271279 A1* | 12/2005 | Fujimura ........... G06K 9/00355 382/203 |
| 2006/0010400 A1 | 1/2006 | Dehlin |
| 2008/0013826 A1 | 1/2008 | Hillis |
| 2009/0313024 A1 | 12/2009 | Black |
| 2010/0023314 A1 | 1/2010 | Hernandez-Rebollar |
| 2010/0281440 A1 | 11/2010 | Underkoffler |
| 2011/0204156 A1 | 8/2011 | Gomez |
| 2011/0317871 A1 | 12/2011 | Tossell |
| 2012/0131513 A1 | 5/2012 | Anshell |
| 2013/0051614 A1 | 2/2013 | Lee |
| 2013/0108994 A1* | 5/2013 | Srinivasa ............. G09B 21/009 434/156 |
| 2013/0204605 A1 | 8/2013 | Illgner-Fehns |
| 2013/0285909 A1 | 10/2013 | Patel |
| 2014/0037191 A1 | 2/2014 | Litvak |
| 2014/0247212 A1 | 9/2014 | Kim |
| 2014/0254870 A1 | 9/2014 | Tsukamoto |
| 2014/0306877 A1* | 10/2014 | Katz ................ G06F 3/017 345/156 |
| 2015/0055821 A1* | 2/2015 | Fotland ................ G06K 9/3241 382/103 |
| 2015/0254870 A1 | 9/2015 | Whitley |
| 2016/0307469 A1 | 10/2016 | Zhou |

FOREIGN PATENT DOCUMENTS

| | | |
|---|---|---|
| EP | 1337914 A1 | 8/2003 |
| WO | 2012135534 A1 | 10/2012 |

OTHER PUBLICATIONS

"An Exploratory Study of Manifolds of Emotional Speech," ICASSP, 2010 Dallas Texas, pp. 5142-5145, Jangwon Kim, Sungbok Lee and Shrikanth S. Narayanan, Signal Analysis and Interpretation Lab (SAIL) University of Southern California, Los Angeles, California, USA.

"Glove-Talk: A neural network interface between a data-glove and a speech synthesizer," S. Sidney Fels and Geoffrey Hinton, IEEE Transactions on Neural Networks, vol. 3, No. 6, Nov. 1992, pp. 1-7.

"Prototype Microsoft Keyboard Recognizes Hand Gestures," Apr. 28, 2014, reproduced from http://newatlas.com/microsoft-research-gesture-recognition-keyboard/31820/?utm_source=Gizmag+Subscribers&utm_campaign=9228fc4be4-UA-2235360-4&utm_medium=email&utm_term=0_65b67362bd-9228fc4be4-91180289, 2 pages.

"Neural Networks for Computer-Human Interfaces: Glove Talk II," S. Sidney Fels, 6 pages, Nov. 27, 1997.

"Glove-Talk II: A neural network interface which maps gestures to parallel formant speech synthesizer controls," Jan. 1, 1998, IEEE Transactions on Neural Networks, vol. 9, Issue 1, 22 pages.

"Glove-Talk: a neural network interface between a data-glove and a speech synthesizer,"S. S. Fels; G. E. Hinton, IEEE Transactions on Neural Networks, Year: 1992, vol. 3, No. 6, 7 pages.

"Modeling the Constraints of Human Hand Motion," John Lin, Ying Wu, Thomas S. Huang, Proceedings Workshop on Human Motion, Year: 2000, pp. 121-126.

"The performance of hand postures in front-and back-of-device interaction for mobile computing," Jacob O.Wobbrock, Brad A.Myers, Htet Htet Aung, Int. J.Human-ComputerStudies 66( 2008) 857-875, Mar. 27, 2008.

Cell Phones Using Gesture Control (w/ Video), 7 pages, web article, Apr. 29, 2010 by John Messina.

"Type in mid-air with a Leap Motion and DexType," web article, GIZMAG, by Paul Ridden Jul. 24, 2013, 10 pages.

* cited by examiner

TECHNIQUES FOR USING GESTURE RECOGNITION TO EFFECTUATE CHARACTER SELECTION

This application claims the benefit of U.S. Provisional Patent Application No. 62/012,247, filed on Jun. 13, 2014 on behalf of first named inventor Thomas Malzbender for "Techniques For Using Gesture Recognition To Effectuate Character Selection." This aforementioned patent application is hereby incorporated by reference.

BACKGROUND

Whether for traditional desktop computers or for newer portable devices (including smart phones), an alphanumeric keyboard is traditionally used to input commands and data. In the case of many newer portable devices, a virtual keyboard is selectively invoked in conjunction with touchscreen control to input individual alphanumeric characters. Despite the pervasive use of an alphanumeric keyboard, command and data entry is relatively inefficient and awkward, a problem only compounded by the small size of virtual keyboards employed for portable devices and with regional language and keyboard differences.

What is needed is a more efficient technique to input commands and data.

Figure 1:
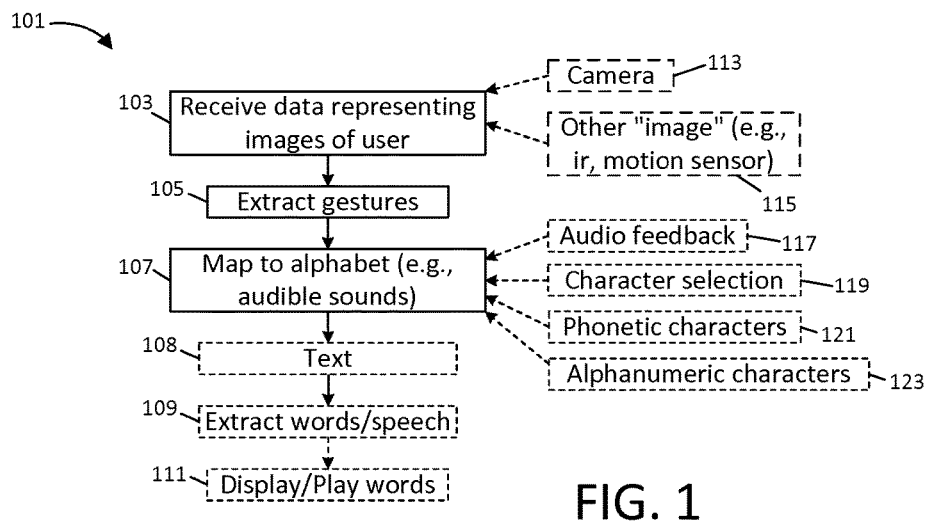
FIG. 1 is a flow diagram showing one method of capturing poses or gestures and extracting characters.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to input text or commands to a computing device based on pose or gesture detection. The various techniques can be embodied as software for performing these tasks, in the form of a portable device such as a smart phone or computer, in the form of a kiosk to provide remote data entry services, as a network-attached service or in another manner. While specific examples are presented, the principles described herein may also be applied to other methods, devices and systems as well.

DETAILED DESCRIPTION

This disclosure provides techniques for inputting commands and data into a computing device. A sensor of a portable device, for example, a camera built into a smart phone, is used to detect a user's hand and capture a hand pose or gesture. This position or motion is then translated into a character set and, optionally, to build words or effectuate commands. More specifically, in a first implementation, the character set is a phonetic character set, such that the user learns a virtual keyboard with the optional assistance of audio feedback, to help the user reliably and quickly effectuate phonetic character selection. In a second implementation, the character set can be a phonetic, alphanumeric (e.g., traditional) or other character set, with audio feedback used to help a user learn positions in three-dimensional space associated with different characters.

For example, in a system that employs audio feedback, a user can move his or her hand and concurrently listen to audio queues triggered by different hand poses or movements; the user in dependence on the audio feedback listens for the desired character and via a hand pose commands acceptance ("entry") of characters confirmed to the user via the audio feedback. In so doing, the user learns poses or gestures that trigger desired character selection. As each user learns how to enter characters, that user learns a more efficient manner of inputting characters to a computing device, in a manner not solely dependent on interaction with a touchscreen. If the virtual keyboard represents a phonetic characters set, this permits users to enter characters in a manner agnostic to regional language and keyboard differences. Thus, the disclosed techniques permit development of a "universal" virtual keyboard, based on human vocal sounds, with selection of words in specific languages being provided by device software; that is, the mentioned techniques permit the same hardware and phonetic character set to be used irrespective of country or region.

Whether alphanumeric or phonetic, one implementation can feature a predefined dictionary which links specific hand poses or gestures to corresponding characters for a multitude of users. In other designs, such a dictionary can be built in a manner adapted to, or customized to, each individual user (e.g., such that a user effectively designs or customizes their own keyboard). In a specific embodiment, the poses or gestures of the human hand are mapped to a character set using principle component analysis (PCA), i.e., to map degrees of freedom of the human hand to a reduced number of dimensions. That is, the human hand possesses at least fifteen degrees of freedom of motion, providing a staggering number of different poses or gestures that could potentially be used for character entry, and that are to be discriminated between. Through training, each individual user learns a character set that easily mapped to a hand pose or set of hand poses, with characters being sufficiently distanced in the dimensional space represented by the human hand to minimize the risk of erroneous character entry. Initially assisted by optional audio feedback, each user if desired can disable such feedback as the user acquires experience in selecting individual characters.

In addition, word selection software can optionally be used on a computing device to convert character entries (e.g., alphanumeric or phonetic) into specific words. In the case of alphanumeric character entries, spell check, grammar check or similar software can be employed to select words based on context. For phonetic character entries, similar types of software can be used to select words based on context. For example, the phonetically-equivalent English language words of "two," "to" and "too" can be discriminated by software, with or without user feedback. Thus, in one embodiment, a user enters phonetic characters (for example, with assistance of a dictionary that maps hand poses or gestures to phonetic elements), with software then optionally providing a mapping between these phonetic elements and the contextual selection of one or more words to build both individual words and/or sentences, in any desired language.

In connection with other optional features, capture of hand poses or gestures can be performed using an image capture device, for example, a camera optionally connected to a network, computer or portable computing device (e.g., a smart phone). Software run by such a network, computer or portable device can employ an awake and detection process, which the software uses to determine whether a user is attempting to input a command or text. For example, the software can employ a very low duty cycle, capturing an image once a period (e.g., every two seconds), and processing the image to determine whether a hand is detected a specified distance from the camera. One or more tests or thresholds can then be employed to selectively awake the camera and capture images at shorter intervals. In a different embodiment, hand pose or gesture detection can be made "always on," or can be turned "on" by a button or icon selection, by audible command, or by other means. Once in a mode where images are being more frequently processed to detect a hand pose or gesture, thresholding can be optionally employed to turn gesture/pose recognition "off" or to enter a sleep mode, for example, if a specific hand pose or gesture (e.g., representing an "off" command) is detected, if the hand moves closer or further than a threshold distance away from the camera, or according to another mechanism. In a mode where the software is actively capturing hand gestures, image processing first receives a sequence of images and processes those images to extract positions and relative orientations of hand and fingers (including the thumb). In one embodiment, the image processing receives pixels representing an image frame (picture) from the camera and it outputs a digital data word representing precise orientation of each degree of freedom of the hand, for example, a base position and distance in space, and multibit values describing the orientation of each finger component of the hand relative to the base position; in other words, image data can be provided as an input (where pixels might represent a hand as well as other data) and image processing software can output digital data defining coordinates and orientations of the hand according to each degree of freedom. Analysis software can then be used to process this digital data to produce an output representing a specific hand pose or gesture. As noted above, this software can use PCA to construct a linear mapping from n-dimension information representing each degree of freedom of the hand to a smaller m-dimensional space, as a prelude to determining whether hand posture or gesture represents any particular character. For example, if n represents 22 dimensions, a lower m-dimensional space of 3-6 dimensions can be used to map the hand to specific characters. As a hypothetical example, these lower space dimensions can include (i) distance from hand to camera, (ii) hand two dimensional position relative to an image frame, (iii) yaw (or rotation of the hand in a horizontal plane relative to the camera, (iv) tilt (rotation of the hand in a vertical plane relative to the camera), (v) whether the hand is open or closed, (vi) whether the thumb is in the same state as the other fingers, and so forth. These dimensional recitations are examples only, and nearly any desired dimension can be used; note that each dimension need not correspond to exactly one degree of freedom of the hand, nor does such definition need to correspond to movement of any one individual joint or finger. Once lower dimensional space is identified, digital data in this m-dimensional space is then applied to a dictionary to determine whether the user is trying to select a specific character.

Note that there exist many alternative implementations of the foregoing. For example, "image" as used herein generally refers to any multidimensional description of the hand captured using one or more sensors, whether or not dependent on visible light or spatially-significant image elements (e.g., pixels); for example, an "image" can be produced by a glove sensor, an infrared sensor, a 3D depth camera, a visible light camera or by other means. Also, while the above-example referred to principal components analysis (PCA) and three specific software modules or elements, this need not be the case for all embodiments. For example, a neural net could be used to gradually learn user hand poses or gestures and to map those poses or gestures to any desired character. In another implementation, template matching can be performed directly on captured image data to match a pose of a user hand to similar data representing predefined poses or gestures (whether taken from the same user or otherwise); alternatively, image data can be filtered or processed, with eigenvector analysis performed to identify significant meaningful hand articulation movements defining a low dimensional hand motion subspace. Clearly, many examples are possible.

Hand poses or gestures can be used to input any desired text or command into a computing device. Such commands or data can include conventional alphanumeric character selection, for example, ASCI characters, such as might be performed with a conventional keyboard, but without requiring a touchscreen to enter each character. Nevertheless, in several contemplated embodiments, such a conventional keyboard is not used, but rather, a more efficient phonetic keyboard is used. Such a structure permits a user to sound out characters and words in a manner matching spoken tongue, and permits the use of software to detect intended words based on any regional language particulars and based on context. In one implementation, each user can be trained to learn such a phonetic alphabet using audible or visible feedback. For example, a dictionary pre-maps a number of different gestures or poses to phonetic elements, and uses an electromagnetic audio speaker to "play" simulated vocal sounds to the user as the user moves his or her hand. Software changes the tonal qualities of the simulated vocal sounds as the hand's pose or gesture changes, permitting the user to change hand position until "the right" vocal sound is achieved, and to select characters corresponding to "entry" of the intended sound. The software builds a string of such characters, which are then phonetically mapped to a written (or spoken) word. Note again that software can perform this mapping in any desired language or even across multiple languages simultaneously. For example, if a particular user is a French language speaker, then a device can employ a French language phonetic dictionary and translate the phonetic sound "ay" to the word "et" (meaning "and" in French), whereas a phonetic dictionary used by an English speaker might translate this same sound to the indefinite article "a." A multilingual dictionary can alternatively be used to map this same sound to either the French word "et" or the English word "a" dependent on context (such as other sounds or words in a common sentence). Note that two or more different dictionaries can be represented, including a dictionary that maps hand poses or gestures to phonetic characters, and a second dictionary that maps one or more phonetic characters to a word, command or other form of language. Context can also be used in conjunction within any one dictionary, for example, the sound "ay" in French could be mapped to the word "et" as mentioned (meaning "and") or as part of the word "manger" (meaning "to eat"). The use of what is effectively a phonetic keyboard (i.e., a phonetic mapping of hand poses or gestures) provides for significant utility relative to an alphanumeric keyboard as, with the latter, the user must remember hand poses or gestures needed to select individual characters, and might then encounter relatively greater difficulty deselecting characters and respelling words. With a phonetic dictionary with audio feedback, hand poses or gestures are directly correlated with vocal sounds and so are less prone to such errors, and can effectively be used to represent multiple alphanumeric characters or even entire words or phrases at-once. In a variation, disclosed techniques provide for a configuration and training mode where a user can be trained to learn a hand gesture alphabet for selecting phonetic elements. Note that audio feedback is not limited to the use of phonetic characters, and for example, can be used with an alphanumeric or other keyboard to reinforce learning of virtual key positions. Also, while audio feedback can utilize vocal sounds in one embodiment (e.g., to match phonetic characters), in other embodiments, audio feedback can features sounds other than vocal sounds; for example, specific sounds can be played in association with certain characters where the sound do not necessarily represent the characters. In one implementation, a user can define their own sounds to be associated with certain commands or keystrokes, programmed via a learning process. These variations provide examples only.

In optional embodiments, users can selectively turn the audio feedback "on" and "off," or can rely on visual feedback (e.g., display of letters, words, colors or other symbols via a display device) representing selected characters. As mentioned, in one embodiment, each user can build his or her dictionary (phonetic or otherwise) or can customize an otherwise common dictionary. As each user might use their hands in a slightly different way (e.g., different height, orientation, etc.), customization of an otherwise common dictionary that maps hand poses or gestures to phonetic characters provides ready ability to accommodate particularities of a wide ranges of users.

Reflecting on the principles introduced so far, the disclosed techniques provide a powerful tool for inputting commands and text into a computing device. Using a smart phone, for example, a user can hold the phone with one hand, input characters using the phone's camera to image the other hand, and speedily and accurately form words simply by articulating the other hand. With audio feedback, and separation of gestures which vary sounds from gestures which "enter" a current sound (i.e., by separating tonal variation from character entry), a user can accurately select only the sound that the user wants. Audio feedback can be adjusted (e.g., for volume) or disabled, such that as a user gains experience and becomes more efficient at character entry, the audio feedback can be discarded, optionally in favor of visual feedback (e.g., via the display screen of the phone). Such a tool does not require a user to discriminate between undersized alphanumeric keys on a small size touchscreen, for example, on a conventional smartphone.

As noted earlier, in one embodiment, characters once input are used to form text or commands. Many examples are possible as to how this can be done. In one embodiment, a contextual dictionary is used, for example, which builds a string of characters and then converts this string to a word or phrase based on context. In one optional embodiment, a list of alternatives is displayed to a user via a display device with the user then selecting (e.g., using a hand pose or gesture) between the displayed alternatives. In a different embodiment, software selects a presumably-intended word and displays this, subsequently correcting existing (displayed) text dependent on context provided by later character entries. A command can optionally be employed (for example, based on audible command, or selected by a button or a specific, recognized pose or hand gesture) to go back, to delete a previous word or character, to add punctuation, to select a displayed word or phrase (or select one of several alternatives), or to otherwise assist with data input. With command capability, for example, provided as part of a hand pose or gesture alphabet, a user can enter text and then issue commands relating to the text being enter or relating to computing functions, for example, saving text as a file, sending an email, and so forth.

As should be apparent from the description above, the presented techniques provide an efficient and natural way of entering commands and text into a computing device or system.

FIG. 1 shows a first embodiment 101 that captures images and maps a user's position or motion to text or speech. Generally speaking, data is first received representing one or more images of a user, per numeral 103. These images are processed to extract poses or gestures, as referenced by numeral 105. This processing can optionally be performed by software stored on non-transitory machine-readable media, for example, software that is downloaded from a remote download site, that is installed locally, or that is otherwise resident on a digital device (such as a computer, smart phone, automotive user interface, etc.). Once gestures are extracted from image data, these gestures are then mapped to characters of a pertinent keyboard or alphabet, per numeral 107. As per the indicated parenthetical, this keyboard/alphabet is optionally an alphabet of vocal sounds or speech, i.e., a phonetic alphabet; that is, as implied by this statement, it is not required that the alphabet or selectable characters consist of alphanumeric characters or a set of standard ASCII characters. As indicated by numeral 108, this process produces text consisting of one or more characters; per numeral 109, these characters can be optionally processed to identify and/or speech. Finally, per dashed-line (optional process) box 111, the extracted text and/or speech can be displayed or presented to a user, e.g., via a digital display or electromagnetic audio speaker. In one design, this display is presented to the same user that entered the gestures, though this need not be the case for all embodiments.

FIG. 1 also shows at its right side a partial listing of other process options (in dashed-line boxes); these options are generally indicated by numerals 113-123. First, as referenced by numeral 113, a device embodying these techniques can optionally include a camera. That is, for example, the method can operate on either images captured by a third party (e.g., received via the Internet) or on images captured locally. In an embodiment where the mentioned techniques are used to input text or commands to a computer (e.g., as an input device for a smart phone, workstation, watch, automobile, portable device, email kiosk, etc.), that device will typically have an embedded or attached camera that captures pictures of at least part of a user (e.g., hand, face, etc.) as a set of pixels representing light in a specific area. Note per the introduction of the term "image" earlier that this need not be the case for all embodiments, i.e., as used herein, the term "image" encompasses data defining individual structures in space, whether represented through infrared data, pictures, coordinates of digits (e.g., of the hand), difference data, or some similar type of non-pictorial representation. This will generally be distinguished from data identifying a pose or gesture, which generally corresponds to a template, or a specific orientation, representing a juxtaposition of multiple structural elements (such as fingers of a human hand). Thus, another type of "image" sensor can also be used, for example, a motion sensor, infrared (IR) sensor, 3D depth camera, glove device, or other type of data capture device. This is represented in FIG. 1 by numeral 115. Per numeral 117, audio feedback can also be used to assist the user (inputting data) with character selection. For example, while audio feedback can be used for ASCII characters (e.g., the letter "a"), in the noted embodiment where phonetic characters are used, audio feedback can include simple vocal tones or phonemes, with a user hearing a specific vocal sound or speech element (e.g., "ur") provided as feedback that changes with position or motion of the hand. As noted earlier, such feedback can be advantageously used, not only to assist with current character selection, but also to help a user gradually learn a pose or gesture alphabet, eventually permitting the user to enter characters more rapidly. As indicated by numeral 119, certain poses or gestures can be used to command character selection (or to input other commands); for example, in one embodiment, as the user changes his or her gesture, a replayed audio sound changes (i.e., without necessarily being selected or "entered"). In one embodiment, therefore, a specific gesture or pose (or combination of gestures or poses) can be additionally used to "select" the current sound (or character) which is then "entered" (and is for example displayed on a digital display screen or used to select a word which is then displayed). Other alternatives are also possible, e.g., where tonal variation is combined with character "entry" depending on the user's gesture. As represented by numeral 121, in one embodiment, the described techniques use phonetic characters, which can be advantageous for a spoken-language-agnostic application. Finally, as indicated by numeral 123, in one embodiment, the described techniques are applied to create a keyboard for traditional text, with specific hand poses or gestures in multidimensional space being mapped to different characters of the selected keyboard. Other alternatives are also possible.

Thus far, an embodiment has been described that can operate using any desired type of pose or gesture, for example, gestures of the human face. In several embodiments to be discussed below, attention will be focused on devices, systems and techniques that specifically rely on poses or gestures of the human hand. For example, in an application where data is to be entered into a digital device (e.g., as a text or command entry tool), the human hand provides a convenient input device that is well-suited to inputting commands into a smart phone or digital tablet, as an example. Such devices typically include high-resolution embedded cameras that can capture video and, thus, as the user optionally holds the phone or tablet with one hand and orients its front-mounted camera toward the user's other hand, the user positions the other hand at an appropriate distance from the digital device, facing the digital device, with hands effectively opened toward each other, in a manner conveniently suited for pose and gesture capture. Note that other arrangements can also be used, for example, a camera (or smart phone) can be mounted on wall, to a pedestal, made part of another user device (such as a watch or automobile), laid on a table, or positioned in some other manner relative to a user's hand. Also, either poses or gestures can be used, or both of them together (e.g., with a pose typically being a position of the hand, and relative position of digits, such as could be represented by a single image, and a gesture typically requiring some type of motion derived from the difference between multiple images). These terms will generally be used interchangeably as encompassing position and/or motion. Also, note that it was earlier referenced that software can be stored on non-transitory (i.e., physical) media. Generally speaking, any of the processes or methods discussed herein can be embodied in the form of instructions stored on non-transitory machine-readable media e.g., as software. "Non-transitory machine-readable media" means any tangible (i.e., physical) storage medium, irrespective of how data on that medium is stored, including without limitation, random access memory, hard disk memory, optical memory, a floppy disk, DVD or CD, server storage, volatile memory and other tangible mechanisms where instructions may subsequently be retrieved by a machine. The machine-readable media can be in standalone form (e.g., a program disk) or embodied as part of a larger mechanism, for example, a laptop computer, portable device, server, network, printer, or other set of one or more devices. The instructions can be implemented in different formats, for example, as metadata that when called is effective to invoke a certain action, Java code or scripting, code written in a specific programming language (e.g., as C++ code, "Java," "JavaScript," "ActiveX," "VBScript," "Apex" or another language) or a processor-specific instruction set, or in some other form; the instructions can also be executed by the same processor or different processors, depending on embodiment. For example, in one implementation, instructions on non-transitory machine-readable media can be executed by a single computer, and in other cases as noted, can be stored and/or executed on a distributed basis, e.g., using one or more servers, web clients, or application-specific devices. Such instructions, or portions thereof, can also be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as is well known.

Thus, one embodiment of the techniques referenced above is as instructions stored on non-transitory machine-readable media; the instructions, when installed and executed, cause a machine (e.g., at least one processor) to function as, what is in effect, a special purpose machine. The software can be already embedded on a device (e.g., smart phone, laptop or workstation), or can be made available for download to such a device (e.g., as a smart phone application, or via another form). In a variation, the software can be stored on a remote server, e.g., with a camera being the only device that is local, and with the remote server providing gesture-to-text or speech translation capabilities (optionally returning the text or speech to the user which input the gestures, or sending the text or speech to another user). In another embodiment, the techniques introduced above are embodied in a smart phone, for example an "iPhone," "Android" or "Windows" device available from various manufacturers; in accordance with the principles above, this device is already loaded with software that performs some or all of the recited functions, such that a phone owner can draft and send emails (or other documents) by using a camera or other sensor embedded on such a device to capture poses or gestures of one of the user's hands. In yet another embodiment, the techniques referenced above are implemented on a public kiosk, for example, that could be positioned in a train station or airport; a user uses hand gestures to enter text and commands, and for example, can compose and send notes and emails without the need of a conventional keyboard or touchscreen. In still another embodiment, the techniques referenced above can be implemented by a watch or user interface within an automobile interior. These embodiments are by no means exhaustive, and many other implementation variations exist.

In one embodiment, functions referred to herein can be embodied as "means for" performing a given function. For example, one embodiment of the mentioned techniques is as an apparatus having means for receiving data representing a string of images, where the string of images represents at least part of a user (e.g., face, foot, head, etc.). Such "means" can include the structures described herein for producing images, for example, a camera, IR sensor, glove device, 3D camera, and so forth, and can be applied to capture any part of a user (including without limitation, the human hand). This embodiment also can include means for processing the data to detect a string of gestures (e.g., poses or gestures) of the user from the images, for example, software that processes the images to derive actual gestures or poses; in one embodiment, this can be performed using software that is programmed to convert image data to multidimensional representations as disclosed herein, optionally using a technique (e.g., principal components analysis or "PCA") to downconvert one set of dimensions into a smaller dimensional space, and optionally mapping this lower dimensional space onto a specific pose or gesture. One skilled in the art has sufficient programming skills to create such code (for example, as code running on an "Android" phone, a laptop, or another device). Similarly, the apparatus can also have means for mapping the string of gestures to a string of characters (such as alphanumeric or phonetic characters), and means for identifying words in a written language corresponding to the string of the elements; once again, this can be implemented as software coded so as to perform these functions on a digital device (e.g., smart phone, watch, automobile, server, etc.) in a manner consistent with the techniques described herein and as exemplified by techniques used by speech recognition software. These apparatus can also include means for displaying or conveying words or speech to the user, for example, a computer (or smart phone) display in the case of visual display, and an electromagnetic audio speaker (e.g. the built-in external speaker of a smart phone) in the case of audio conveyance of words or speech. Generally speaking, nearly any function described herein can be expressed as means for performing a function, with such means generally encompassing computer code and/or other structures described herein, and their equivalents.

Figure 2A:
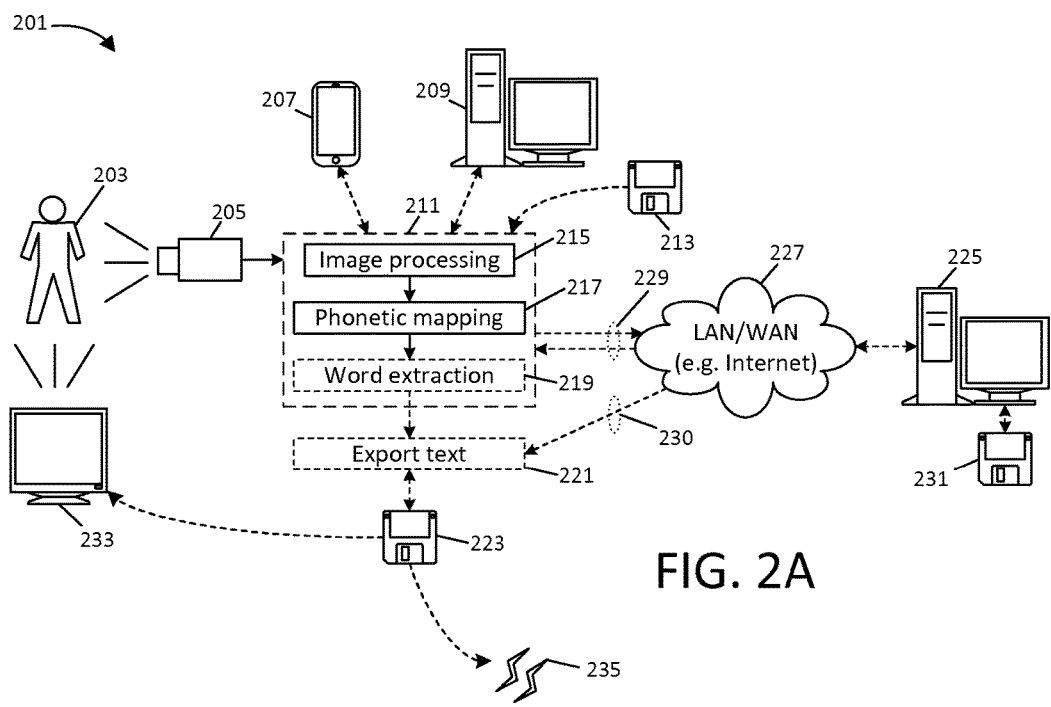
FIG. 2A shows one embodiment of a system that captures poses or gestures and extracts phonetic characters.

FIG. 2A shows an embodiment 201 used to further explain some of the principles introduced above. More specifically, a human user is represented at numeral 203, in juxtaposition to an imaging device 205, e.g., a camera. Numerals 207 and 209 respectively denote that this camera (and/or any of the processing software to be described hereinafter) can also optionally be an integral part of a smart phone or computer. Such devices receive images from the imaging device and process these images to detect position and/or motion of a part of the user, e.g., poses or gestures. Such devices also run software 211, i.e., instructions stored on non-transitory machine-readable media as denoted by floppy disk icon 213 (note this icon denotes that any non-transitory machine-readable media can be used, e.g., active random access memory or RAM, hard dis memory, flash memory, and so forth). The software is seen to perform functions of image processing (to convert image data to poses or gestures), phonetic mapping (to convert poses or gestures to phonetic characters representing vocal sounds or speech) and optional word extraction (to identify words represented by the phonetic characters), as respectively indicated by numerals 215, 217 and 219. This software can be implemented as unitary code, or as multiple modules that interact with each other via function calls or otherwise. For example, this code could be implemented using a set of linked libraries, with one or more elements of code implemented using open source software. It is also possible for this code to reside on multiple machines; for example, the functions of image processing and phonetic mapping 215 and 217 could be performed on a smart phone with data being sent over a network (e.g., local area network "LAN" or wide area network "WAN" 227) to a remote machine or machines (such as one or more servers 225), with the remote machine(s) then performing the remaining word extraction function 219. Many other examples (combinations and permutations) are also possible including any other allocation of the mentioned functions across these machines and/or smart phone 207 and/or computer 209. Note that the one or more servers 225 typically possess their own software stored on machine-readable media 231 to implement some of these functions. In one implementation, extracted text or speech (if isolated by the depicted one or more servers 225) can be sent back to the same user that input this information (e.g., via pipe 229) and, in another embodiment, the extracted speech or text can be sent elsewhere, as represented by network path 230. Per optional process 223, any isolated text or speech (whether transmitted back to the smart phone or workstation, on the one or more servers 225, or on another device) can be exported (221) and, if desired, saved onto non-transitory machine readable media 223. This extracted text or speech can be displayed or played to a user (e.g., via display device/monitor 233 or an electromagnetic audio speaker) or otherwise transmitted to another location as represented by a transmission icon 235. Note that if displayed, such display (233) can optionally be a device integral with the smart phone 209, computer 209 or one or more servers 225 (for example a touchscreen or standalone display monitor associated with these devices). Note also that although the smart phone 207 is depicted apart from the computer 209, in fact, the smart phone is a type of computer and that many other types of microprocessor-based digital devices can also be used (as also being a computer), for example a watch (e.g., having embedded camera and display). Clearly other examples are possible.

Figure 2B:
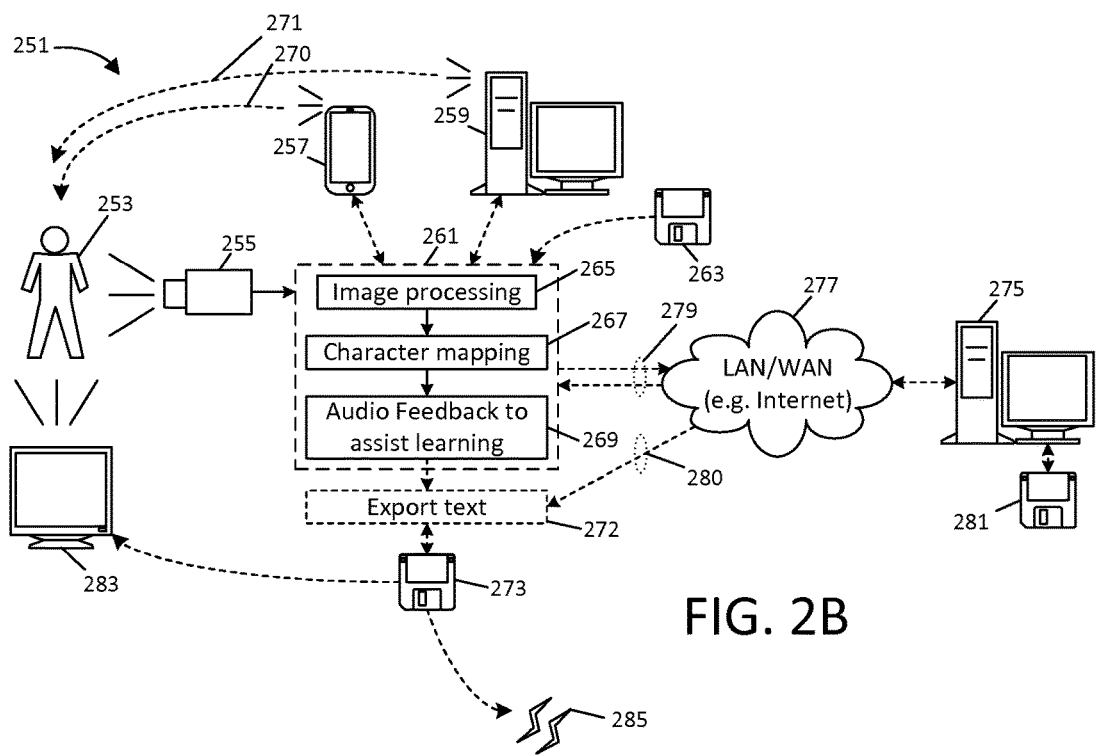
FIG. 2B shows one embodiment of a system that captures poses or gestures and extracts characters, e.g., alphanumeric or phonetic characters; audio feedback is used to assist a user with learning of a virtual keyboard.

FIG. 2B shows a second embodiment where poses or gestures are used to enter characters (e.g., alphanumeric, phonetic or otherwise) with audio feedback being used to assist learning of a virtual keyboard by a user. More specifically, a user 253 effectuates poses or gestures, for example, hand poses or gestures before a camera 255. As before, the camera can be coupled to or be an integral part of a smart phone 257 or other type of computer device 259 (for example, a workstation, laptop, watch, email kiosk, automobile user interface, etc.). Also as before, processors that are either local (e.g., part of device 257/259) or remote (e.g. part of servers 275) employ software 261 to perform functions of image processing 265 (i.e., gesture/pose interpretation), character mapping 267 (i.e., converting poses to characters). This software can be stored on non-transitory machine readable media 263/281 that can either be internal to machines 257/259/275, or downloaded via network attached storage (or for example, loaded via a disk or flash card, etc.). The audio feedback is represented by numeral 269 and is similarly effectuated by software operating on one or more processors of device 257/259. For example, as shown by dashed arrows 270/271, an electromagnetic audio speaker is advantageously used to pay vocal sounds that mimic human speech back to the user for the user to hear; as the user moves his or her hand, the one changes, permitting the user to move his or her hand to learn the proper position to effectuate a specific sound. When the user identifies the correct sound, the user signifies character entry (e.g., by a specific hand pose or gesture, such as by closing the hand to make a fist). Note that these techniques can be used with alphanumeric characters, phonetic characters or other character sets as appropriate. For example, with an alphanumeric character set, the name of the letter (e.g., "L", pronounced "ell") is audibly played to the user as the hand pose or gesture approaches the appropriate position. As referenced earlier (and as further discussed below) a training or learning process can be optionally used to assist with user learning in conjunction with such feedback, and audio feedback can optionally be disabled in some embodiments. Note that as referenced by bidirectional arrows 279, processing can be distributed in some implementations between machine 257/259 and the optional remote server 275, with exchanges directed over the internet. For example, in one embodiment, pose or gesture is interpreted locally with character selection effected by a network 277; such an approach can be advantageous for certain applications, such as for example, for gaming applications. Irrespective of the distribution of the depicted software functions, text based on multiple characters is optionally exported (272) and stored on machine-readable media 273. The extraction of text can be performed from other the network (as indicated by arrow 280), and can be used to provide visual or other feedback to the user as to word selection (283) or otherwise used to transmit text or speech to a remote destination (285).

Figure 3A:
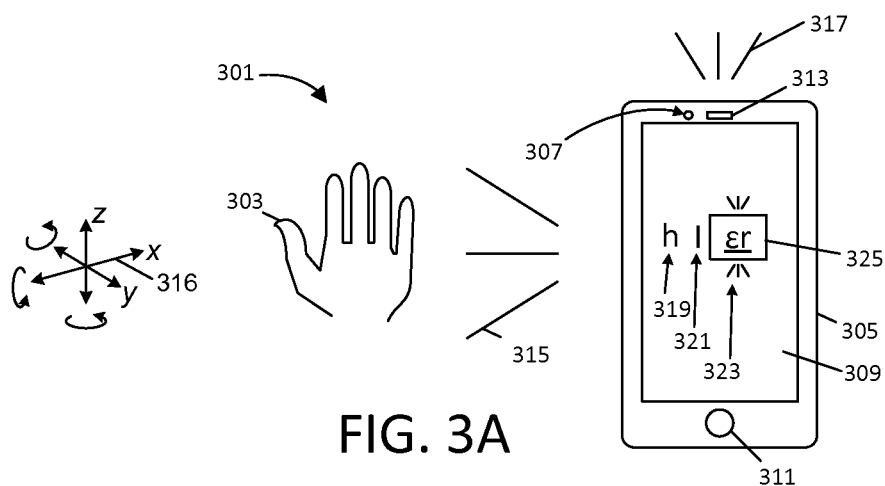
FIG. 3A is an illustrative diagram showing techniques for capturing hand poses or gestures with a digital device, such as a smart phone; the screen of the depicted smart phone is seen to visually display phonetic character entries.
Figure 3B:
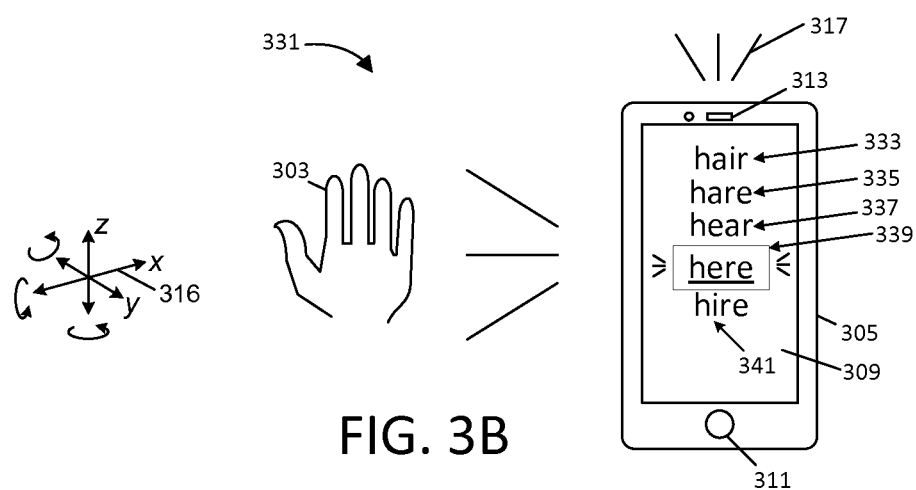
FIG. 3B is an illustrative diagram that shows techniques for capturing hand poses or gestures with a digital device; the screen of the depicted smart phone is seen to visually display alternative words derived from a phonetic character set.
Figure 3C:
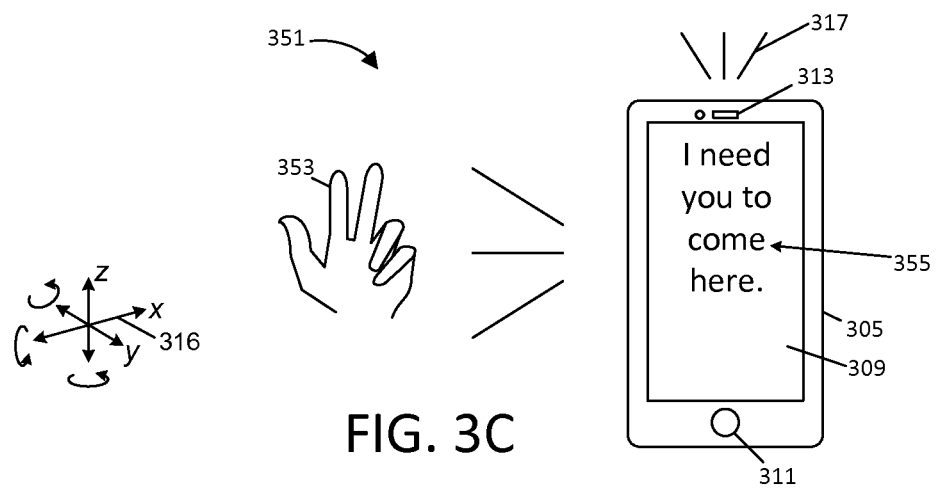
FIG. 3C is an illustrative diagram that shows techniques for capturing hand poses or gestures with a digital device; the screen of the depicted smart phone is seen to visually display a sentence that includes a specific word ("here") which has been selected based on context.

FIGS. 3A-3C are used to provide additional detail regarding the operation of software in extracting text or speech in one exemplary embodiment. More specifically, FIG. 3A shows a configuration 301 where a human hand 303 is to be imaged using an input mechanism for a digital device 305 (in this case, a smart phone). Numeral 307 refers to the input mechanism which is a front-mounted camera of the smart phone. The smart phone also includes a display screen 309 (e.g., a touchscreen), a menu/selection button 311, and an electromagnetic audio speaker 313, all built-in to the smart phone in this particular case. The user can hold the smart phone in one of the user's hands (not shown), so as to be juxtaposed in a manner facing the other hand (303), and so that the front-mounted camera 307 images the user's other hand 303, as represented by captured incident light 315. Note that in other embodiments, a standalone camera can be used, multiple cameras can be used, images can be received from memory (or from a source other than a camera), or a rear-mounted smart phone camera can be used. Also, as indicated earlier, instead of holding a phone with one hand to face another, a camera (e.g., and phone) can be mounted to a pedestal, laid upon a table, or positioned in some other manner to perform or assist with capture of poses or gestures. Other alternatives are also possible.

As the user articulates the hand 303 to adopt various poses or gestures, software running on the smart phone analyzes these poses or gestures (from captured photographic images in this case, typically video images), including the various orientations of the hand itself and its various degrees of freedom, e.g., whether the hand and/or individual fingers are open, closed, bent, crossed, rotated, and so forth, relative to one another and relative to the direction of image capture (315). These various degrees of freedom are represented by a six-dimension icon 316, representing translational x, y and z motion of the hand and its digits relative to each other and to the smart phone 305, and also dimensions of roll, pitch and yaw, once again, relative to other hand structures and relative to the smart phone 305. Software running on the smart phone and/or a remote computer or server receives images of the hand 303 taken by the camera 307, performs various control functions (to be discussed below) and determines whether a hand pose or gesture is presented (to be discussed below). Note that the human hand has at least fifteen degrees of freedom (e.g., many joints of fingers can be moved or bent independently of one another, sometimes in multiple directions, while other joint motions are interdependent, e.g., some fingers can only be moved with another finger); there are therefore many, many thousands to millions of possible poses or gestures that can be expressed by the hand. In one embodiment, software running on the smart phone (or remote computer or server receiving data relayed by the smart phone) processes the image to identify position of the hand in each degree of freedom represented by image area captured by the smart phone camera. For example, assuming a hypothetical 2 megapixel image of an area before the front-mounted camera 307, such an image can be processed (a) to determine whether a hand is present (e.g., by template matching or appropriate thresholding), (b) to determine hand distance from the camera, and (c) to analyze direction of hand orientation and inclination or rotation of each individual joint of the hand, relative to its distance from the camera. As will be explained below in reference to FIGS. 4A-4B, the first of these optional processes can be employed as a power savings measure, e.g., to run either a processor and/or image detection software of the smart phone, or the camera 307, at a low duty cycle such that power is not wasted when no hand is present. When a hand is present, and is determined to be within a specific distance range (i.e., within two distance thresholds), the processor and/or software and/or camera can be woken up and used to process much more frequently captured images (and/or utilize higher-resolution images) to detect position and/or motion of the hand. Software that analysis individual degrees of freedom of the hand can be in one embodiment invoked selectively (e.g., as a subroutine or function call) only when the hand is determined to be within the proper distance range from the camera; in other embodiments, this processing is invoked on an indefinite basis or on a basis commensurate with the image processing software. The image processing software advantageously processes one or more images to detect relative motion of the hand in each degree of freedom, scaling how it analyzes images (e.g., detection of each joint) dependent on distance of the hand from the camera. Once the software has finished this analysis and has a digital value for each degree of freedom, additional software is then invoked (e.g., using matrices derived from PCA, as mentioned earlier) to downconvert the measured degrees of freedom into lower dimensional space (e.g., to 3-6 dimensions representing xyz position/motion as well as certain hand poses, such as whether the fist is open or closed, whether the thumb or select digits are extended or bent, whether the fist is rotated, and so forth), to obtain a pose or gesture. The software then calls a predefined library (e.g., table) and matches the determined pose or gesture to a specific phonetic element. In alternate embodiments, these two steps can be combined (e.g., using template-matching or eigenvector analysis that directly fits a captured image to a library of hand pose/gesture templates associated with specific vocal sounds). Note that this fitting can be performed in a number of ways, for example, based on exact fit in reduced dimension space or to a predefined template, to a minimal distance to the nearest table element (i.e., phonetic character in this example), or to sounds that are interpolated between multiple characters. Dependent on the character that the software matches to pose or gesture (if any), the software causes the smart phone to play an audible sound 317 from electromagnetic speaker, with this audible cue providing feedback to the user to adjust hand pose until the desired phonetic character is heard. Optionally, the user then moves the hand in a specific way (e.g., closes the fist) to select the audiblized character, and the software is then effective to accept that character and to seek a new, subsequent character, in order to build words or phrases.

FIG. 3A shows three such characters, "h" "i" and "ɛr," representing a phonetic spelling of the English word "hire." These three characters are respectively observed on the display screen as indicated by numerals 319, 321 and 323, with the last character highlighted (as indicated by numeral 325) to indicate that it corresponds to a currently-audiblized sound, i.e., the character has not yet been selected. Note that the visual display of phonetic characters is optional, and that many variations and possibilities exist; for example, instead of visual display of characters, the software can be instead and/or in addition configured to receive a hand pose that commands an audible reproduction of a string of characters, e.g., "h-i-ɛr." Many other possibilities exist.

Software on the smart phone (or remote computer or server) then optionally matches the entered characters to one or more words of one or more dictionaries; in one embodiment, this process is performed continuously, such that as hand pose changes, a selection of a looked-up matching word changes, with a display presenting the current (changing) selection.

FIG. 3B shows such an implementation 331. In this case, it is assumed that the user has selected characters corresponding to the displayed string (e.g., "h-i-ɛr") and further that software has understood (e.g., based on configuration, region or context) that the user wishes to employ an English language dictionary. In this case, the smart phone retrieves words in the English language that are closely mapped to the phonetic characters selected by the user (e.g., via a distance measure, well within the skill of one familiar with digital analysis of speech). For example, the smart phone of FIG. 3B is seen to display phonetically-similar words of "hair," "hare," "hear", "here" and "hire," represented by numerals 333, 335, 337, 339 and 341 respectively, with the word "here" being highlighted relative to other words. If this selection is correct, the user can command selection of this word by a hand gesture (e.g., closing a fist) or alternatively, such selection can be based on context. For example, FIG. 3C shows a depiction 351 where a user has manipulated fingers to effectuate a command, for example, to select the word "here" from the choices seen in FIG. 3B. Note that it was earlier mentioned that multiple dictionaries can be used; in one embodiment, dictionaries corresponding to many languages are searched, with the search being narrowed to a specific language based on context. For example, FIG. 3C shows the smart phone of FIGS. 3A-B, but this time displaying a sequence or string of words "I want you to come here" representing past word selection; in such a case, based on prior identification of English language words, the software can limit or bias its selection to other English words, for example, the word "here." Note that FIG. 3C represents another optional feature of the depicted embodiment, i.e., optional software not only selects individual words (such as seen in FIG. 3B) but can also form phrases or sentences based on context, using a contextual dictionary, as referenced by numeral 355. For example, relative to the example of multiple alternate words in FIG. 3B, the software could as a default automatically select the word "here" (e.g., based on the fact that of the selections seen in FIG. 3B, that the word "here" is the only selection that makes sense in the context of the sentence "I want you to come _____"). The coding of software to perform contextual selection is well within the skill of one skilled in the art, e.g., contextual word selection is already performed by certain spell check software, speech recognition software, and by certain mobile device software platforms in connection with touchscreen keyboards.

While the discussion of FIGS. 3A-3C focused on an implementation that uses a phonetic character set, the described techniques can also be used for alphanumeric or other character sets. For example, the depictions of FIGS. 3A-3C (and their associated discussions) apply the assembling of multiple alphanumeric characters, i.e., by effectuating individual character entries based on hand gestures and poses detected in 3D space at a predetermined distance from an imaging device (e.g., a cell phone or computer-attached camera).

Reflecting on the examples just introduced, it should be apparent that the disclosed techniques provide an efficient way of entering data and/or commands. A user is not necessarily required to touch a display screen or keyboard; a user of a smart phone, for example, is not required to select individual alphanumeric keys among many displayed on a (relatively small) touchscreen (e.g., at a size smaller than the human finger). In addition, in embodiments that rely on phonetic character sets, a user can effectively select sounds representing complex letter combinations; such selection facilitates word lookup, because the phonetic elements can be effectively mapped in three-dimensional image capture space so as to minimize erroneous character selection and because phonetically similar words can be easily displayed together (i.e., notwithstanding different alphanumeric spellings, for example). Whether or not used with a phonetic character set, audible feedback to the user, if employed, further helps minimize the possibility of erroneous character entry (and further, reinforces user learning of the "3D virtual keyboard" effectively created by this system, and the correspondence of that keyboard to specific phonetic characters). Optional building of both words and phrases by local or remote software helps provide a system where a user can compose speech or text and/or command actions (e.g., opening, drafting and sending an email to a specified recipient) in a manner not dependent on physical interaction with an input device to select commands or characters. The disclosed techniques facilitate a more efficient means of data and command entry.

Figure 4A:
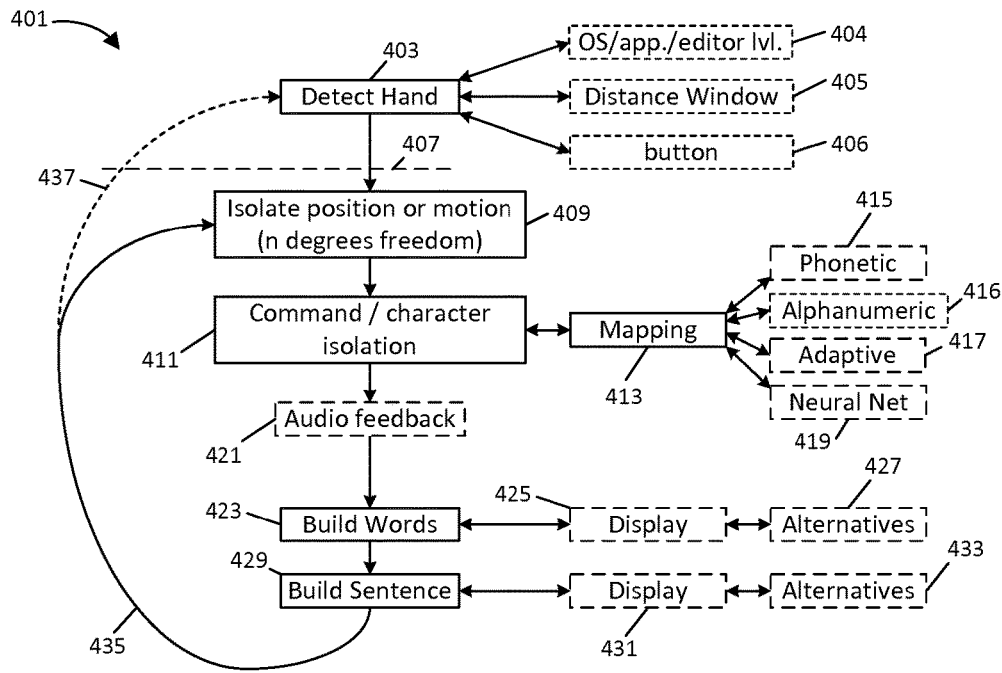
FIG. 4A is a flowchart of one method for detecting hand poses or gestures and responsively building a sentence.
Figure 4B:
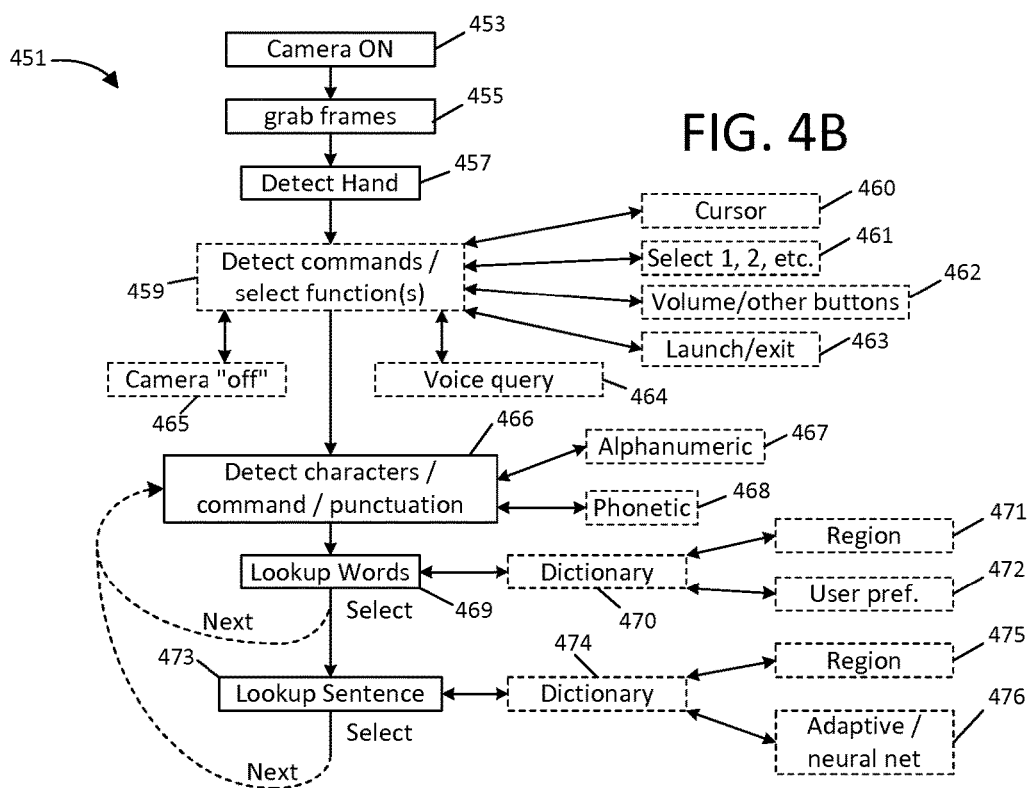
FIG. 4B is a flowchart of another method for detecting hand poses or gestures and responsively building a sentence.
Figure 4C:
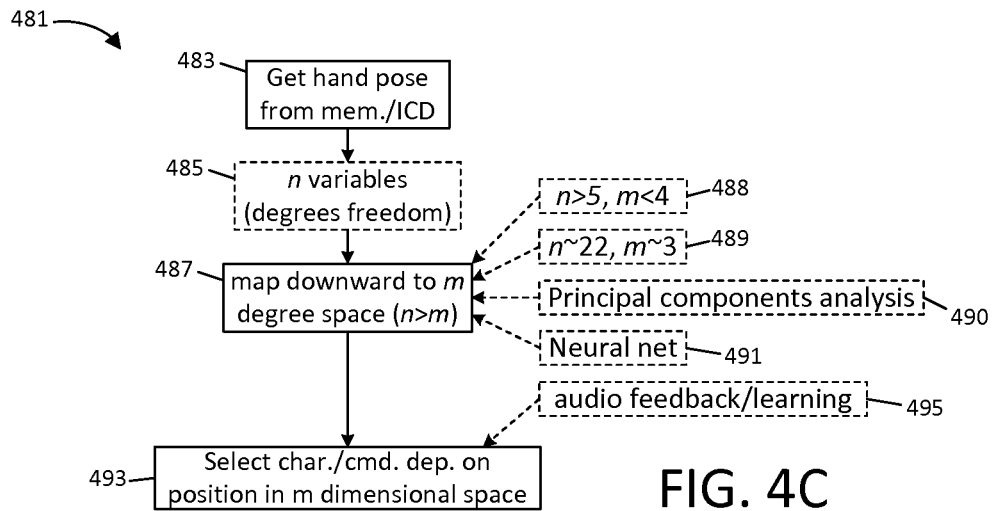
FIG. 4C is a flowchart of a method for converting an image of a hand to lower dimensional space, and then selecting a specific character based on hand pose or gesture.

FIGS. 4A-4C are used to explain some specific software embodiments of the mentioned techniques.

FIG. 4A is a flowchart that depicts a first method 401, e.g., employed by suitably-coded software. Per numeral 403, the software is seen to be in a state where it is called upon to detect presence of a hand; this can be an omnipresent background state depending on embodiment, or a state that is specifically entered:

(a) as a selective-invoked operating system level service, as an application, or via an editing dialog (e.g., "compose email"), as represented by optional process numeral 404;

(b) upon detecting an object proximate to a specific surface of an input device, such as a front-mounted smart phone camera (e.g., the input device can be run at low resolution, low duty cycle capture, and only instructed to switch to a high-duty cycle and/or high-resolution capture mode when an object is detected and is determined by image processing software to be a hand within the right distance range, as represented by optional process numeral 405); or (c) when a user selects a specific button (406), e.g., by turning an input device specifically "on" or by interacting with a graphical user interface (GUI) explicitly for this purpose.

Once a hand is detected, the method 401 switches from a standby (offline) mode into an active mode where it is actively searching for hand poses, as demarked by a process separation line 407. For example, in such an active mode, the software can perform detailed processing of an image or frame buffer at a desired rate (e.g., with every video image, or every "jth" frame), scrutinizing individual degrees of freedom of the hand as part of image processing, as referenced earlier. To this effect, in the depicted embodiment, when the method is in "active" mode, the software attempts to isolate position or motion in n degrees of freedom, per numeral 409. For example, for an embodiment that seeks to image a human hand, the software can process images to detect hand position or motion in 9-15 or more degrees of freedom. As indicated by numeral 411, dependent on the detected position/motion, the software then proceeds to isolate specific commands or characters. To this effect, the software references a mapping (413) which provides what is effectively a library or table lookup to map hand position/motion to specific characters. In one embodiment, this mapping is predetermined, with specific hand positions and gestures (that must be learned by the user) defined to correspond to certain phonetic characters, per numeral 415. In another embodiment, the mapping can be to an alphanumeric (or other) character set 416. Alternatively, instead of a predetermined mapping, the mapping can be made dynamic and adapted to the particular user, with a configuration process being employed to permit the user to define their own (or customize their own) keyboard, for example, by defining during a learning process certain positions that will be associated with certain predetermined (audible or other) characters. This adaptive process is represented by numeral 417. Per numeral 419, in an optional embodiment, a neural net is employed by the software to learn user hand positions and motions in an evolving manner. Note that such a process can be performed independently for each user (e.g., with a mapping stored local to the digital device or computer that is to receive user input), or with data remotely uploaded and combined with data from other users to help define a community mapping, for example, that can vary by country, region or community. As noted earlier, audio feedback (421) can be optionally employed to help a user learn the desired character set or keyboard (e.g., phonetic or alphanumeric character set) and to minimize erroneous character selection. User character entry, as and when accomplished, is used to build words, per numeral 423, and/or full phrases or sentences, per numeral 429. As depicted by numerals 425 and 431, characters and words can be optionally displayed to the user, either in isolation, or as part of lists of alternatives, 427 and 433. As each character is entered (and used to select a word and/or sentence as appropriate), the process then loops per numeral 435 to process hand position and/or motion to search for another character. Optionally, per branch path 437, if software loses or is unable to detect position of the hand, or upon user command, the software optionally reverts to the off-line mode; as an example, if the depicted application is an email generation service, and the user sends a completed email, the software could be instructed to exit a gesture-based text/command entry mode.

FIG. 4B shows a flow diagram associated with another method 451. More specifically, in the depicted method, a user, an application or the operating system (OS) must first activate an image capture function, per numeral 453. As this function is initiated, the camera is turned on and produces frames of digital images. The software then samples or retrieves image frames (or portions of frames) and performs image processing, in an attempt to detect a hand, per numerals 455 and 457. The software then operates in a mode where it attempts to detect commands, per optional process 459. For example, in such a mode, the software might be configured to not (yet) accept character entry, but simply to process commands (one of which can activate a text editor function, per numeral 467). Optionally, hand pose or gesture can be used to control a cursor (460), select traditional keyboard characters such as numerals (461), manipulate device characteristics also controlled by physical buttons (462, e.g., volume of a smart phone, power off, etc.), or launch or exit specific applications 463. Commands can also be used to activate other input devices (464, e.g., to accept voice queries) or to exit the image capture function and turn off the camera (465). Naturally, many other commands and functions can be invoked or controlled, depending on design. If a data or character entry mode is entered, per numeral 466, the software can process a character set as well as accept text editor commands, commands for punctuation marks, and other types of functions, as indicated. Either phonetic or alphanumeric characters can be selected, per numerals 467/468. As indicated by numeral 469, the text editor can optionally look up words, for example, using a dictionary 470, with dictionary choice or selection optionally being based on region or other context (471) or user preference or input (472). As each character is entered, the text editor can loop back for an ensuing character ("next") or can attempt to place a selected word into a sentence, per numeral 473. As with word selection, this process can also be made dependent on a dictionary 474 that is implied based on region (475) or is adaptively learned (e.g., the software uses a Russian language dictionary if it learns that the speaker is a Russian, or has a specific style or pattern of speech). Again, the depicted method represents merely one possible implementation that can be suitably-coded by one familiar with software design (e.g., smart phone or table OS application design and available operating systems).

FIG. 4C shows yet another method 481, more specifically, a method associated with mapping hand position and/or motion to reduced dimensional space. More specifically, the software retrieves a hand pose or other gesture from memory or from an image capture device, as referenced by numeral 483. Per numeral 485, hand position and/or motion is seen to be defined as a vector in n dimensions (i.e., n degrees of freedom). The software uses a mathematical transformation to map this position and/or motion downward to m degree space, per numeral 487. As denoted by various process options, in one embodiment (488), n is greater than 5 in number, while m is less than 4 in number; for example, n can be 6 (six dimensional space) and m can be 3 (three dimensional space). In another embodiment (489), the downconversion can be much more substantial, e.g., with n being on the order of 22 (twenty-two degrees of freedom) and with m being many orders of magnitude less, e.g., 3 (three degrees of freedom). Per numeral 490, in one implementation, principal components analysis (PCA) is used to derive the matrices used to perform this downconversion, while in another embodiment (491), this downconversion is performed by a neural net.

Downconversion can substantially ease the computational requirements imposed on software to map hand poses or gestures to specific characters in a character set. In one embodiment, the software transmits hand pose or gesture (as represented in lower dimensional space) to another software module, for example, locally or on a remote machine, in order to select specific characters (493). As noted earlier, audio feedback can optionally be employed to assist with this process (495).

As was mentioned earlier, any or all of the functions represented above can be performed by dedicated software on respective machines. For example, it is possible to perform the recited techniques on a distributed basis, for example, using different servers or network components, or using remote memory, image capture devices, display screens and so forth. Some optional implementations associated with these principles will be further discussed below in connection with FIGS. 6-7. Note that generally, these functions can be coded using instructions sets suitable to the specific operating platform or platforms, and that such code can be stored in non-transitory machine-readable media, either on a standalone basis (e.g., as software for distribution) or as part of a device (e.g., in volatile or nonvolatile memory of a computer or smart phone). In yet another embodiment, such code can be operated (stored and/or executed) by a party who provides gesture-based character entry or related services on service-bureau basis, optionally for fee.

Figure 5:
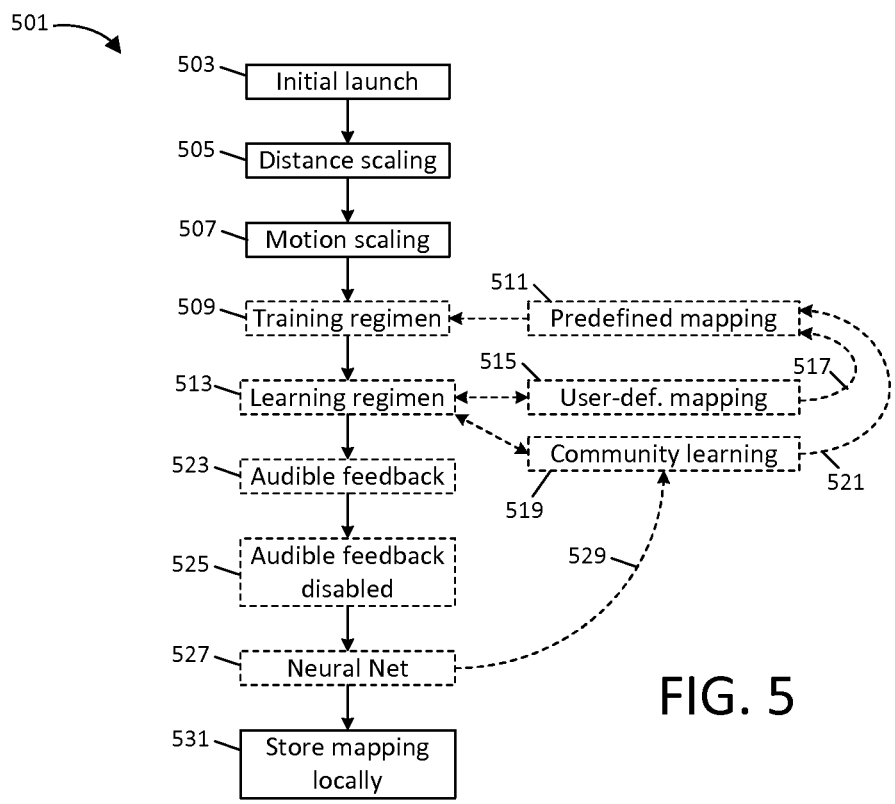
FIG. 5 is a flowchart of an initialization or calibration method used to configure a device to convert hand poses or gestures to text or speech.

FIG. 5 is another flowchart used to describe an optional configuration or learning process 501, to initialize or customize pose or gesture recognition software. For example, such a configuration process 501 can be performed on a one-time basis, for example, at application download or installation, or at initial application launch (as represented by numeral 503). As part of the configuration process, the software is scripted to learn and store preferences and tendencies of one or more individual users; for example, each user might have a different size hand, or be left-handed or right-handed (and use a specific hand for character entry), missing a finger, or tend to employ hand gestures with a hand that is relatively close to an image capture device or relatively far from an image capture device. The software therefore optionally first employs a configuration and scaling process where it learns the size, typical distance and other default parameters associated with the user's hand, per process block 507. When this is completed, the software optionally initiates a training regimen where it trains the user to enter certain characters, per numeral 509. For example, the software can use a predefined mapping per numeral 511, where specific phonetic characters are associated with respective virtual keyboard positions in three-dimensional space. The user is provided with visual or audible feedback that trains the user to move his or her hand in a specific way or to a specific position in order to learn the predefined characters. Per numeral 513, the software can also employ a learning regimen where it learns positions or gestures that the user would like to use to select certain characters. Such a process facilitates a user-defined keyboard or mapping of phonetic elements to desired hand positions and/or motions, per numeral 515; optionally, per numeral 517, this same process can be used to customize a default or predefined mapping (511). Alternatively, as just noted, user preferences can be factored into a position/gesture mapping as part of a community learning process 519, with a community mapping varying regionally or based on group membership; this process can also be used to customize a predefined mapping (as represented by numeral 521). As noted earlier, in one embodiment, audible feedback is used to enhance character entry and this feedback (if supported) is also advantageously used during the training process (per numeral 523) to assist with learning. Alternatively or in addition, some embodiments can provide an ability for a user to disable audible feedback per numeral 525, for example, should the user have already mastered a particular position/motion to character mapping and not require reinforcement provided by such feedback. Per numeral 527, a neural net can also be used to adjust (529) any desired mapping, for example, adjusting the mapping over time dependent on user tendencies. As the mapping is generated or adjusted, it can be locally stored, for example, in RAM or non-volatile memory (e.g., hard disk or SD card memory) to provide locally accessible character definition responsive to detected user gestures.

Figure 6:
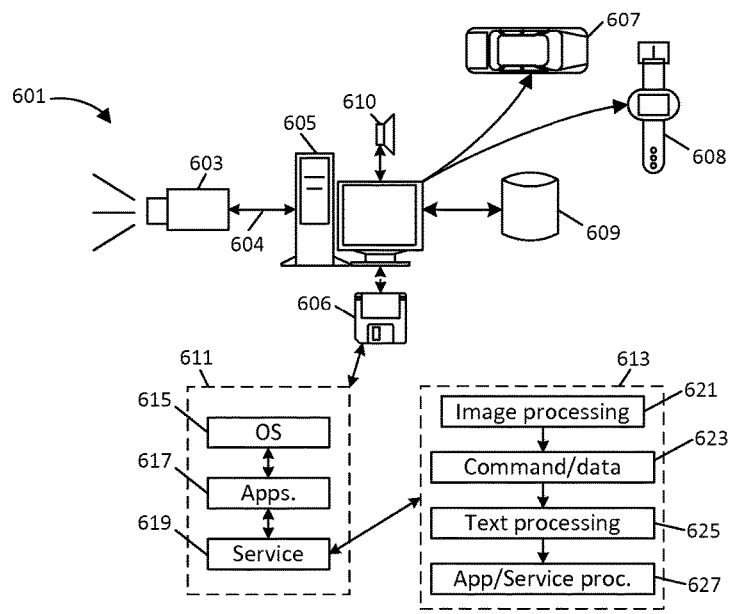
FIG. 6 shows an embodiment where hand poses are used to input data to a computer, such as the depicted workstation or a server, via an external input device.
Figure 7:
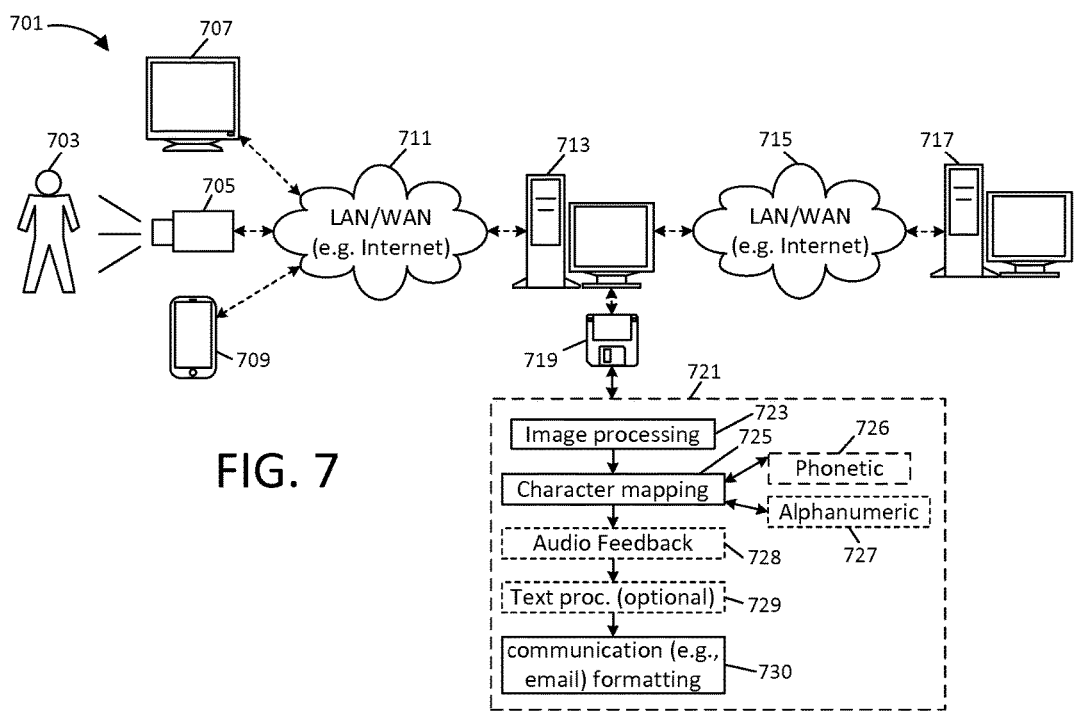
FIG. 7 shows an implementation that provides for remote hand pose or gesture capture, with a network accessible device or service providing conversion to text or speech.

Additional implementations are further exemplified by reference to FIGS. 6 and 7. FIG. 6 shows an implementation 601 where gesture recognition is used to provide a virtual keyboard for inputting text and commands into a computer system 605, and FIG. 7 shows an implementation 701 where a detached camera (e.g., a kiosk) is used to input data and commands for remote services.

More particularly, in FIG. 6, a detached camera or other image sensor 603 is connected by a cable 604 to a computer (such as a desktop computer 605) and used to input commands and data. The computer is depicted as a general purpose machine having one or more processors (e.g., such as a central processing unit, "CPU," and one or more dedicated image processors) being run under the auspices of software 611 stored on machine-readable media 606. Once again, this media is non-transitory media, for example, a physical memory board in the computer, hard disk storage, CD or other type of non-transitory device, as introduced earlier. As referenced by numerals 607 and 608, the computer can optionally be embodied as a watch or a user interface to vehicle computer system, for example, accessed via the interior of a car (or external to a car, e.g., via an appropriately-mounted imaging device). The software 611 has one or more programs, modules, and services that include instructions that cause one or more of the processors to be configured as a special purpose machine, that is, executing specific tasks as dictated by the instructions. The software 611 is seen to include an operating system (OS)

615, one or more applications 617, and a service 619, in particular, a service that is invoked to perform pose or gesture recognition and associated data and command extrapolation, as appropriate, and as introduced above. This service 619 is invoked as an application that can be indirectly called by the operating system 615 or any of the applications 617, depending on embodiment. As an example, the computer 605 can have an input mouse, keyboard, stylus pad and any other conventional input mechanism (not shown); the operating system 615 can feature an accessibility mode which is specially configured or entered in order to use gesture recognition as outlined above. Alternatively, specific applications or programs 617 (e.g., email programs, gaming programs, drawing programs, text editors and so forth) can be launched and can generally or selectively issue function calls to service 619 in order to launch gesture recognition, as outlined above. The service 619 can be a system service or an application level service, e.g., such that a user of the computer can directly launch the service 619 as an application (if implemented in this manner). An exploded box 613, seen at the right hand side of FIG. 6, shows functions associated with the service 619, including image processing 621 (to convert hand position and motion to a pose), command and/or data mapping 623, word and/or sentence extraction 625, and finally, interaction with, or a return to, the underlying application or master service 627, if any. To provide a hypothetical illustration, service 619 in one application is generally active as a background service. When a user launches an application, for example, an email program, the email program selectively issues calls to this service (bringing it into the foreground to effectuate command entry and/or data entry). The user employs hand gestures to perform tasks such as opening an existing email or creating a new email, and switching between various fields (e.g., such as to perform destination address selection). As each command is entered, the pose- or gesture-recognition service 619 interacts with the email program, for example, to open a new email and present it to the user on a display of the computer 605. The user then uses service 619 to open a message body field and composes a message which is similarly displayed to the user. The user finalizes the email message and sends the email using pose- or gesture-based commands which are recognized by the service 619 and used to command the hypothetical email program to send the message (much as would be sent according to commands from a keyboard and mouse, for example). Note that as desired (e.g., as the user interacts to compose the body of the message), data can be optionally stored on hard disk drive (HDD) 609 for archiving and/or retrieval at a later point in time. The memory represented by HDD 609 and non-transitory machine-readable media 607 are in one embodiment, the same memory (e.g., flash, RAM, ROM, HDD, etc.). It should be appreciated that while an email application is referenced by the mentioned-example, pose or gesture recognition can be employed with nearly any application; for example, one specifically-contemplated application of pose and/or gesture recognition is to gaming applications. As represented by numeral 610, the computer advantageously includes an electromagnetic audio speaker for playing sounds back to the user as the user's hand is recognized in various positions or movements; as indicated earlier, this audio feedback facilitates more accurate character entry, as well as gradual user learning of character position and improved efficiency at character selection.

FIG. 7 shows an embodiment where an input device is optionally detached from a supporting digital device such as a computer. A user 703 approaches a camera 705 where the camera is either a standalone device or part of a larger machine. If desired, the camera can be accompanied by a monitor 707 which provides instructions and assistance with pose- or gesture-based input. Alternatively, camera 705 and monitor 707 can be combined as one device, for example, employed as a remote kiosk as mentioned or a gaming device; in one embodiment, a smart phone 709 (e.g., an old "iPhone") can be employed to provide both functions and is network-connected to a remove computer 713 via a local or wide area network 711. As the user enters poses or gestures, the local device 705/707/709 cooperates with the computer 713 to perform pose or gesture recognition as has been described above. Note that, in this embodiment, much of the software is employed on a remote device (i.e., computer 713), with the local device 705/707/709 sending raw image data, hand pose or gesture, or individual characters or words to remote computer 713. Thus, some or all of the software described earlier is resident on non-transitory machine-readable media 719 associated with computer 713, and optionally, some of this software is instead present on the local device (705/707/709) or an intermediate device (not shown). The user interacts with the remote device 713 to receive services, for example, email services, ATM services, password entry or authentication, or any other desired function. If desired, remote device 713 is part of a network 715, where requests interpreted by remote device 713 can be formatted and sent to another network destination 717, for example, a third party. In such an implementation, the communication between remote device 713 and network destination 717 is the same as any other remote or web-based interaction, except that local machine uses software 721 to perform at least some of the gesture-based recognition functions described earlier. That is, poses, gestures, commands and/or data are interpreted in part by remote device 713, which then interacts with the user or serves as an intermediate for building user requests and interacting on behalf of the user with network destination 717. In a hypothetical application, local device 705/707/709 is embodied as a kiosk where travelers can input data using hand poses and gestures. At least partially-supported by the remote device 713, these poses or gestures are subjected to image processing 723, phonetic mapping 725 and work extraction 727 to exchange commands and data with remote device 713. In the depicted application, the remote device and kiosk provide an email/communication system, so the software 721 is seen as including utilities 729 for exchanging communication with a third party, for example, by accessing an account and sending an email on behalf of the user. Note that, depending on implementation, the user might only have access to a camera (or other image sensor) with all software processing occurring remotely. The depicted configuration can also (instead) feature a local computer, for example, attached to camera 705 via a cable or local area network.

As mentioned, the described techniques provide for more efficient data entry and thus provide an alternative input mechanism for inputting data and commands in to a computer. In various embodiments, the use of phonetic characters provides advantages that audio feedback can be used to assist with character-entry and learning by users, and helps minimize erroneous data entries; the use of a phonetic alphabet is also more efficient. In other embodiments, training and/or learning processes can be used to help the user master a wide variety of commands and character sets; in one implementation, the gesture-based recognition can be used to implement traditional (e.g., ASCII) characters into a computer or as a gaming mechanish. In another embodiment, a user can interact with a remote destination by a camera or other image sensor, with gesture-based processing provided as a third party service. Clearly, many alternatives are possible.

While many embodiments described above hand pose/motion recognition, this need not be used for all embodiments; as one non-limiting example, one embodiment can recognize facial gestures (e.g., lip movements or movements of the user's head or another body part). In another embodiment, the user can employ a device (e.g., a wand) which is used to derive a pose dependent on image processing and/or wand orientation. The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

As indicated, various modifications and changes may be made to the embodiments presented herein without departing from the broader spirit and scope of the disclosure. For example, features or aspects of any of the embodiments may be applied, at least where practical, in combination with any other of the embodiments or in place of counterpart features or aspects thereof. Thus, for example, not all features are shown in each and every drawing and, for example, a feature or technique shown in accordance with the embodiment of one drawing should be assumed to be optionally employable as an element of, or in combination of, features of any other drawing or embodiment, even if not specifically called out in the specification. Accordingly, the specification and drawings are to be regarded in an illustrative rather than a restrictive sense.

I claim:

1. A method, comprising:
    receiving with a computing device digital data representing a string of images, the images representing at least part of a user;
    processing the data using software to detect therefrom a string of gestures of the user, each gesture represented as a vector;
    mapping the vectors to a string of phonetic elements; and
    identifying one or more words in a written language, the one or more words corresponding to the string of the phonetic elements;
    wherein
        the written language is a one of a plurality of regional languages,
        mapping the vectors to the string of phonetic elements comprises selecting each phonetic element in the string of phonetic elements in a manner that is agnostic to any one of the plurality of regional languages, and
        identifying the one or more words comprises selecting a contextual dictionary specific to a selected one of the plurality of regional languages, the selected one corresponding to the written language, and translating the string of phonetic elements to the selected language; and
    wherein further
        each vector comprises a position in n-degree space, and wherein mapping further comprises translating the position in n-degree space to a position in m-degree space, where n>m, and selecting a phonetic element uniquely associated with the position in m-degree space,
        translating includes accessing a dictionary to map positions in n-degree space to corresponding positions in m-degree space, and
        the method further comprises using principal components analysis to adaptively learn the dictionary.

2. The method of claim 1, wherein receiving comprises capturing the string of images by controlling a camera of the computing device, and where in the data comprises image data from the camera.

3. The method of claim 2, wherein the software comprises image processing software, wherein controlling the camera further comprises capturing video using the camera, and wherein processing the data further comprises processing the video using the software to detect the string of gestures.

4. The method of claim 2, wherein the camera is a 3-dimensional image capture device, and wherein processing the data further comprises processing three-dimensional images to detect the string of gestures.

5. The method of claim 1, wherein the computing device comprises a smart phone and wherein the software comprises an application executable by the smart phone.

6. The method of claim 5, wherein mapping the string of gestures comprises transmitting information representing the string of gestures to a remote server and wherein identifying words in the written language comprises receiving data representing the words from the remote server.

7. The method of claim 1, further comprising displaying the words to the user via a visual display of the computing device.

8. The method of claim 1, further comprising playing sounds to the user corresponding to mapped phonetic elements.

9. The method of claim 8, further comprising providing the user with an option to selectively enable and disable the playing of the sounds.

10. The method of claim 1, wherein at least one of processing the data and mapping the string of gestures to the string of phonetic elements comprises using a neural net to learn desired user phonetic selections responsive to unique gestures of a particular user.

11. The method of claim 1, wherein the images encompass a hand of the user, wherein the gestures encompass hand poses, and wherein at least some of the vectors correspond to hand poses.

12. The method of claim 1, embodied as a method of inputting words to a computing device.

13. An apparatus comprising instructions stored on non-transitory machine-readable media, the instructions when executed to cause at least one processor to:
    receive data representing a string of images, the images representing at least part of a user;
    process the data to detect therefrom a string of gestures, each gesture represented by a vector;
    map the vectors to a string of phonetic elements; and
    automatically identify words in a written language, the words corresponding to the string of the phonetic elements;
    wherein
        the written language is a one of a plurality of regional languages,
        the instructions when executed are to cause the at least one processor to map the vectors to the string of phonetic elements by selecting each element in the string of phonetic elements in a manner that is agnostic to any one of the plurality of regional languages, an the instructions when executed are to cause the at least one processor to automatically identify the words in the written language by selecting a contextual dictionary specific to a selected one of the plurality of regional languages, the selected one corresponding to the written language, and translating the string of phonetic elements to the selected language; and wherein further each vector comprises a position in n-degree space, the instructions when executed are to cause the at least one processor to map the vectors by translating the position in n-degree space to a position in m-degree space, where n>m, and selecting a phonetic element uniquely associated with the position in m-degree space, the translating is performed by accessing a dictionary to map positions in n-degree space to corresponding positions in m-degree space, and the instructions when executed are further to cause the at least one processor to use principal components analysis to adaptively learn the dictionary.

14. An apparatus, comprising:

an input device to receive data representing a string of images, the string of images representing at least part of a user; and at least one processor to process the data to detect a string of gestures of the user from the images, each gesture corresponding to a vector, map the vectors to a string of phonetic elements, and automatically identify words in a written language, the identifies words corresponding to the string of the phonetic elements;

wherein the written language is a one of a plurality of regional languages, the at least one processor is to map the vectors to the string of phonetic elements by selecting each element in the string of phonetic elements in a manner that is agnostic to any one of the plurality of regional languages, an the at least one processor is to automatically identify the words in the written language by selecting a contextual dictionary specific to a selected one of the plurality of regional languages, the selected one corresponding to the written language, and translating the string of phonetic elements to the selected language; and wherein further each vector comprises a position in n-degree space, the at least one processor is to map the vectors by translating the position in n-degree space to a position in m-degree space, where n>m, and selecting a phonetic element uniquely associated with the position in m-degree space, the translating is performed by accessing a dictionary to map positions in n-degree space to corresponding positions in m-degree space, and the at least one processor is further to use principal components analysis to adaptively learn the dictionary.

15. The apparatus of claim 14, embodied as a smart phone.

16. The apparatus of claim 14, wherein the input device comprises a 3-dimensional image capture device, and wherein the apparatus further comprises instructions stored on machine-readable media to cause the at least one processor to process three-dimensional images from the 3-dimensional image capture device to detect the string of gestures.

17. The apparatus of claim 14, wherein the at least part of the user includes a hand, wherein each image comprises information sufficient to determine a pose of the hand, and wherein each vector represents a pose of the hand.

* * * * *